(12) United States Patent
Kim et al.

(10) Patent No.: US 8,066,394 B2
(45) Date of Patent: *Nov. 29, 2011

(54) BACKLIGHT ASSEMBLY AND DISPLAY DEVICE HAVING THE SAME

(75) Inventors: Won-Ju Kim, Yongin-si (KR); Min-Ho Ok, Hwaseong-si (KR); Yoon-Soo Kwon, Seoul (KR); Jung-Tae Kang, Suwon-si (KR); Sang-Hoon Park, Yongin-si (KR); Jin-Ho Ha, Suwon-si (KR); Woong-Jae Chang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,243

(22) Filed: Aug. 24, 2010

(65) Prior Publication Data

US 2011/0002113 A1  Jan. 6, 2011

Related U.S. Application Data

(63) Continuation of application No. 11/436,706, filed on May 18, 2006, now Pat. No. 7,806,544.

(30) Foreign Application Priority Data

May 19, 2005 (KR) ........................ 10-2005-0042061
Jan. 12, 2006 (KR) ........................ 10-2006-0003390

(51) Int. Cl.
*G09F 13/04* (2006.01)
*F21V 21/00* (2006.01)

(52) U.S. Cl. .................. 362/97.1; 362/225; 362/217.11; 362/396

(58) Field of Classification Search .......... 362/630–634, 362/217.09, 225, 97.1, 249.01, 217.1, 217.11–217.17, 362/396; 349/63, 70
See application file for complete search history.

(56) References Cited

U.S. PATENT DOCUMENTS

| | | | |
|---|---|---|---|
| 5,195,822 A | 3/1993 | Takahashi et al. | |
| 6,459,203 B1 | 10/2002 | Kim | |
| 6,905,224 B2 | 6/2005 | Yoo et al. | |
| 6,908,212 B2 | 6/2005 | Schultz | |
| 7,090,387 B2 | 8/2006 | Kohno | |
| 2003/0112626 A1 | 6/2003 | Yoo et al. | |
| 2005/0243571 A1 | 11/2005 | Kang et al. | |
| 2006/0012983 A1 | 1/2006 | Fu et al. | |

FOREIGN PATENT DOCUMENTS

CN  1575505 A  2/2005

*Primary Examiner* — Thomas Sember
(74) *Attorney, Agent, or Firm* — Cantor Colburn LLP

(57) ABSTRACT

A backlight assembly includes a plurality of lamps, a receiving container and a conductive member. Each of the lamps includes a lamp body, a first electrode part disposed at a first end portion of the lamp body and a second electrode part disposed at a second end portion of the lamp body, the second end portion being opposite to the first end portion. The receiving container includes a bottom plate on which the lamps are disposed and a sidewall disposed at edge portions of the bottom plate to define a receiving space. The receiving container has a plurality of grounding portions formed on the bottom plate or the sidewalls. The conductive member electrically connects the second electrode part to one of the grounding portions.

20 Claims, 17 Drawing Sheets

BACKLIGHT ASSEMBLY AND DISPLAY DEVICE HAVING THE SAME

CROSS REFERENCE TO RELATED APPLICATIONS

This application is a continuation application of U.S. application Ser. No. 11/436,706 filed on May 18, 2006, which claims priority to Korean Patent Application No. 2005-42061 filed on May 19, 2005 and Korean Patent Application No. 2006-3390 filed on Jan. 12, 2006, the contents of which are herein incorporated by reference in their entireties.

BACKGROUND OF THE INVENTION

1. Field of the Invention

The present invention relates to a backlight assembly and a display device having the backlight assembly. More particularly, the present invention relates to a backlight assembly having a reduced number of elements for driving lamps, and a is display device having the backlight assembly.

2. Description of the Related Art

In general, a liquid crystal display (LCD) device displays images by controlling an optical transmittance of each pixel arranged in a matrix shape. The LCD device uses light provided by a backlight assembly to display images.

The LCD device includes an LCD panel having a plurality of pixels arranged in a matrix shape, a driver integrated circuit (IC) that drives pixels of the LCD panel, and a backlight assembly that provides the LCD panel with light.

The backlight assembly may be classified as either a direct illumination type or an edge illumination type. According to the direct illumination type backlight assembly, a light source such as a lamp is disposed under the LCD panel to provide the liquid crystal panel with light. According to the edge illumination type backlight assembly, a light guide plate is disposed under the LCD panel and a light source such as a lamp is disposed at a side of the light guide plate, so that light generated by the light source is applied to the liquid crystal panel through the light guide plate.

The direction illumination type backlight assembly has relatively lower luminance uniformity and durability, but high light-using efficiency and luminance because a plurality of lamps is driven in parallel. Therefore, the direct illumination type backlight assembly is primarily used in large-sized LCD devices. In order to drive the lamps in parallel, a conventional LCD device includes an inverter master, an inverter slave and a return wire. The inverter master provides a hot electrode of each of the lamps with a lamp-driving voltage, and the inverter slave grounds a cold electrode of each of the lamps, and provides a conducting pattern for feeding electric current outputted from the cold electrode back to the inverter master. The return wire electrically connects the conducting pattern to the inverter master to transfer the electric current outputted from the cold electrode. The inverter includes a circuit for uniformizing deviation of the lamp-driving voltage applied to the lamps by using the feedback current.

As the inverter slave, a printed circuit board (PCB) may be employed. The lamps may be grounded directly to the inverter slave or to a receiving container via the inverter slave.

However, according to above-mentioned backlight assembly, the lamps are respectively connected to the inverter slave. As a result, a number of steps in backlight assembly process increases, the return wiring is complex, and assembling side molds with a receiving container becomes complex. Therefore, productivity is lowered.

BRIEF SUMMARY OF THE INVENTION

One exemplary embodiment provides a backlight assembly having a reduced number of elements for driving lamps in parallel.

Another exemplary embodiment provides a display device having the above backlight assembly.

One exemplary embodiment of a backlight assembly includes a plurality of lamps, a receiving container and a conductive member. Each of the lamps includes a lamp body, a first electrode part disposed at a first end portion of the lamp body and a second electrode part disposed at a second end portion of the lamp body, the second end portion being opposite to the first end portion. The receiving container includes a bottom plate on which the lamps are disposed, and sidewalls disposed at edge portions of the bottom plate to define a receiving space. The receiving container has a plurality of grounding portions formed on the bottom plate or the sidewalls. Each of the conductive members electrically connects the second electrode part to one of the grounding portions.

In another exemplary embodiment, the grounding portions protrude from the bottom plate such that each of the grounding portions is disposed between adjacent second electrode parts and each of the conductive members is fastened to one of the grounding portions.

In another exemplary embodiment, the backlight assembly further comprises a lamp holder and a wire. The lamp holder receives the second end portions of the lamp body with the second electrode part. The wire electrically connects the second electrode part to one of the conductive members.

In another exemplary embodiment, four lamps adjacent to each other are disposed corresponding to the one of the grounding portions and two first adjacent lamps disposed symmetrically with respect to one of the grounding portions and two second adjacent lamps disposed symmetrically with respect to the grounding portion are electrically connected to the grounding portion.

In another exemplary embodiment, a display device includes a receiving container, a plurality of conductive members, a power supply unit, a plurality of lamps and a display panel. The receiving container includes a bottom plate and sidewalls disposed at edge portions of the bottom plate. The conductive members are electrically connected to the receiving container. The power supply unit is disposed on a back side face of the bottom plate. The power supply unit generates a lamp-driving voltage. Each of the lamps includes a lamp body disposed on the bottom plate, a first electrode part disposed at a first end portion of the lamp body, and a second electrode part disposed at a second end portion of the lamp body, the second end portion being opposite to the first end portion. The display panel displays images using light generated by the lamps.

In another exemplary embodiment, the conductive members are fastened to grounding portions protruded from the bottom plate and disposed between second electrode parts and at least two of the second electrode parts adjacent to one of the conductive members are electrically connected to the one of the conductive members.

In another exemplary embodiment, a display device includes a display panel, a plurality of lamps, a plurality of lamp holders, a receiving container and a plurality of conductive members. The display panel displays images. Each of the lamps includes a lamp body emitting light to a back side of the display panel, and electrode parts disposed at end portions of the lamp body. The lamp holders are combined with the end portions of the lamp body such that a portion of the electrode parts protrudes from the lamp holders to support the lamps.

The receiving container receives the lamps. The conductive members are fastened to the receiving container. Each of the conductive members is electrically connected to at least one of the electrode parts.

In another exemplary embodiment, the receiving container includes a plurality of grounding portions and the conductive members are electrically connected to the grounding portions.

In another exemplary embodiment, each of the conductive members includes a combination portion through which the conductive members are combined with the receiving container and a contact portion extended from the combination portion along a direction that is substantially perpendicular to a lengthwise direction of the lamps.

In another exemplary embodiment, the display device may further include a first side mold that receives the lamp holder and a second side mold that receives the conductive members, the first and second side molds supporting end portions of the display panel.

In another exemplary embodiment, the combination portion is higher than the contact portion with respect to a bottom plate of the receiving container.

In another exemplary embodiment of the present invention, the conductive members are separated from each other.

In another exemplary embodiment, the contact portion is combined with the electrode parts through soldering.

In another exemplary embodiment, the contact portion includes a first contact portion and a second contact portion extended from the combination portion along an opposite direction. The lamps are paired to form lamp pairs, and the lamp pairs are combined with the lamp holders, and the first and second contact portions make contact with a portion of the electrode parts protruded from the lamp holder.

In another exemplary embodiment, each of the grounding portions is disposed between adjacent lamp holders.

In another exemplary embodiment, the grounding portions may be protruded from a bottom plate of the receiving container toward the display panel.

In another exemplary embodiment, the contact portions include a contact groove and the electrode part is inserted into the contact groove.

In another exemplary embodiment of the backlight assembly and the display device, the second electrode part of the lamp is grounded through a simple structure as described above. Advantageously, a number of elements for forming the backlight assembly and the display device may be reduced to enhance simplicity of assembling the backlight assembly and the display device.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
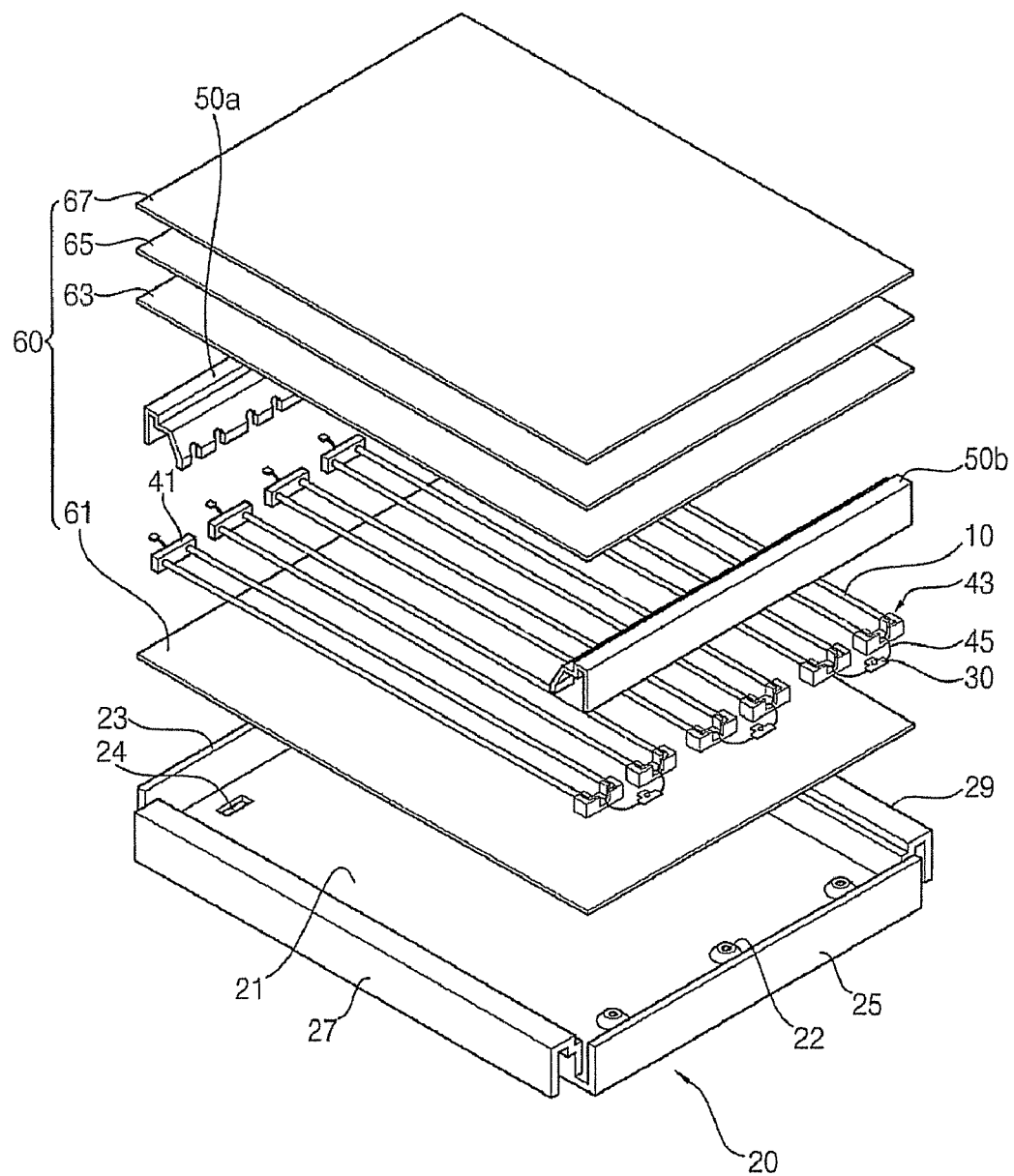
FIG. 1 is an exploded perspective view illustrating an exemplary embodiment of a backlight assembly according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on, connected or coupled to the other element or layer or intervening elements or layers may be present. In contrast, when an element is referred to as being "directly on" or "directly connected to" or another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view illustrating an exemplary embodiment of a backlight assembly according to the present invention.

Referring to FIG. 1, a backlight assembly 5 a plurality of lamps 10, a receiving container 20 and a conductive member 30.

The lamps 10 are driven in parallel. In one exemplary embodiment, a cold cathode fluorescent lamp (CCFL) may be employed as a type of the lamps 10. Each of the lamps 10 includes a lamp body 11, a first electrode part 13 (see FIG. 2) and a second electrode part 15 (see FIG. 4).

The lamp body 11 corresponds to a tube having a discharge gas including, but not limited to, argon (Ar), mercury (Hg), etc., injected thereinto. The tube may have a cylindrical shape. The lamp body 11 may include a fluorescent layer formed on an inner surface of the lamp body 11. The first electrode part 13 and the second electrode part 15 are disposed at opposite end portions of the lamp body 11. The first electrode part 13 includes a first discharge electrode and a first lead wire. The first discharge electrode is disposed inside of the lamp body 11, and the first lead wire is extended towards the outside of the lamp body 11 from the discharge electrode. The second electrode part 15 may also include a second discharge electrode and a second lead wire.

A lamp-driving voltage is applied to the first electrode part 13 (shown in a dotted line in FIG. 2) from a power supply unit that is to be explained in detail below, and the second electrode part 15 is grounded. As a result, an electric field is generated between the first electrode part 13 and the second electrode part 15 to induce an arc discharge. The discharge gas in the lamp body 11 generates ultraviolet light through the arc discharge. The ultraviolet light is changed to a visible light by the fluorescent layer.

In an alternative exemplary embodiment, an external electrode fluorescent lamp (EEFL) may be employed as a type of the lamps 10. The EEFL has high luminance, low price and low power consumption, and a plurality of EEFLs may be driven by one power supply unit.

Figure 2:
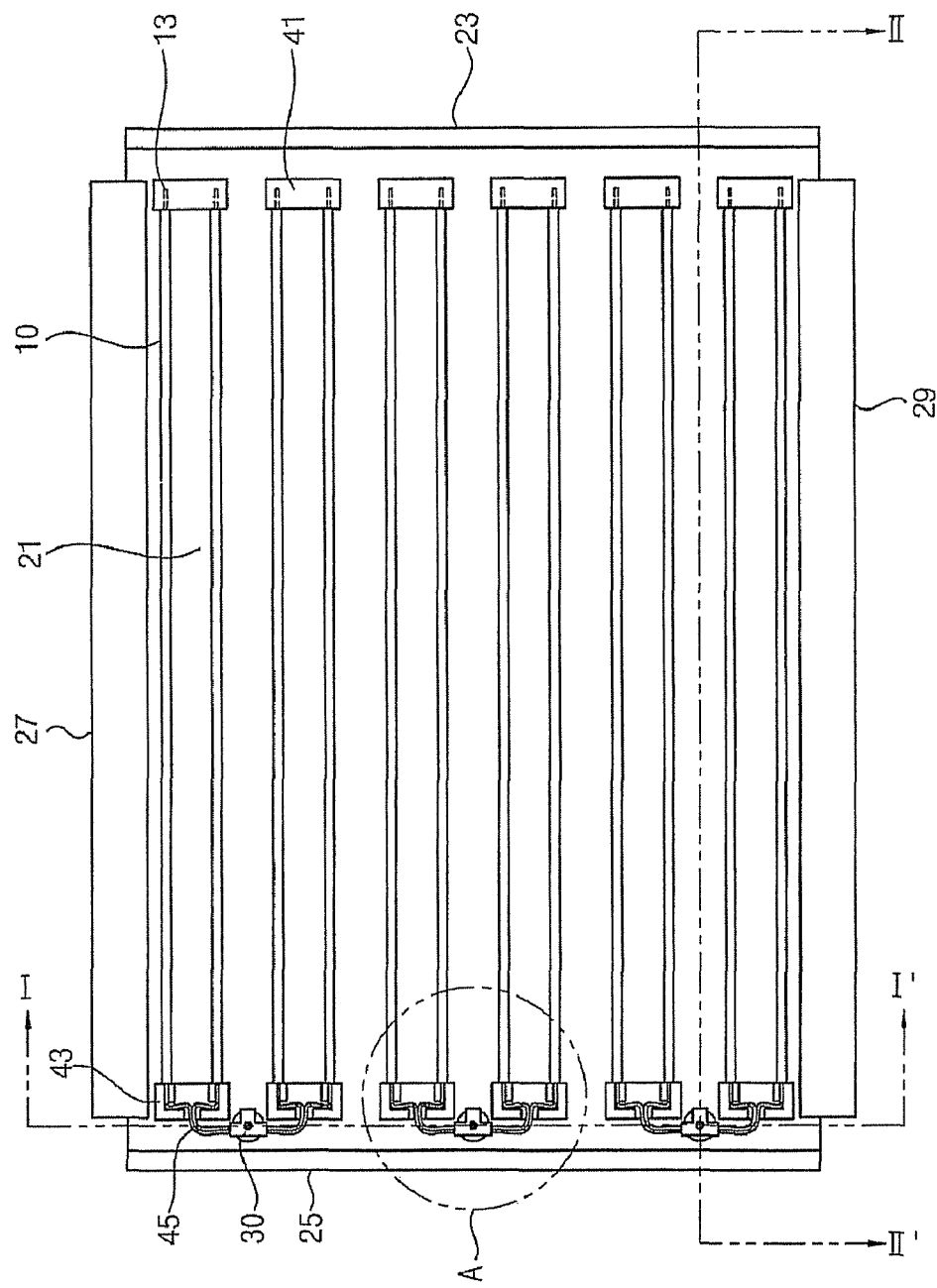
FIG. 2 is a plane view illustrating the backlight assembly in FIG. 1.

FIG. 2 is a plane view illustrating the backlight assembly in FIG. 1.

Referring to FIGS. 1 and 2, a receiving container 20 receives the plurality of lamps 10. The receiving container 20 includes a bottom plate 21, a first sidewall 23, a second sidewall 25, a third sidewall 27 and a fourth sidewall 29.

The bottom plate 21 may have a substantially rectangular shape. The first to fourth sidewalls 23, 25, 27 and 29 are disposed at edge portions of the bottom plate 21 and extend substantially vertically from the bottom plate 21. The first and second sidewalls 23 and 25 face each other, and the third and fourth sidewalls 27 and 29 face each other. The third and fourth sidewalls 27 and 29 connect the first and second sidewalls 23 and 25. The third and fourth sidewalls 27 and 29 include stepped portions at top portions of the third and fourth sidewalls 27 and 29, respectively.

The bottom plate 21 includes a plurality of openings 24 arranged along the first sidewall 23, and a plurality of grounding portions 22 arranged along the second sidewall 25.

Figure 3:
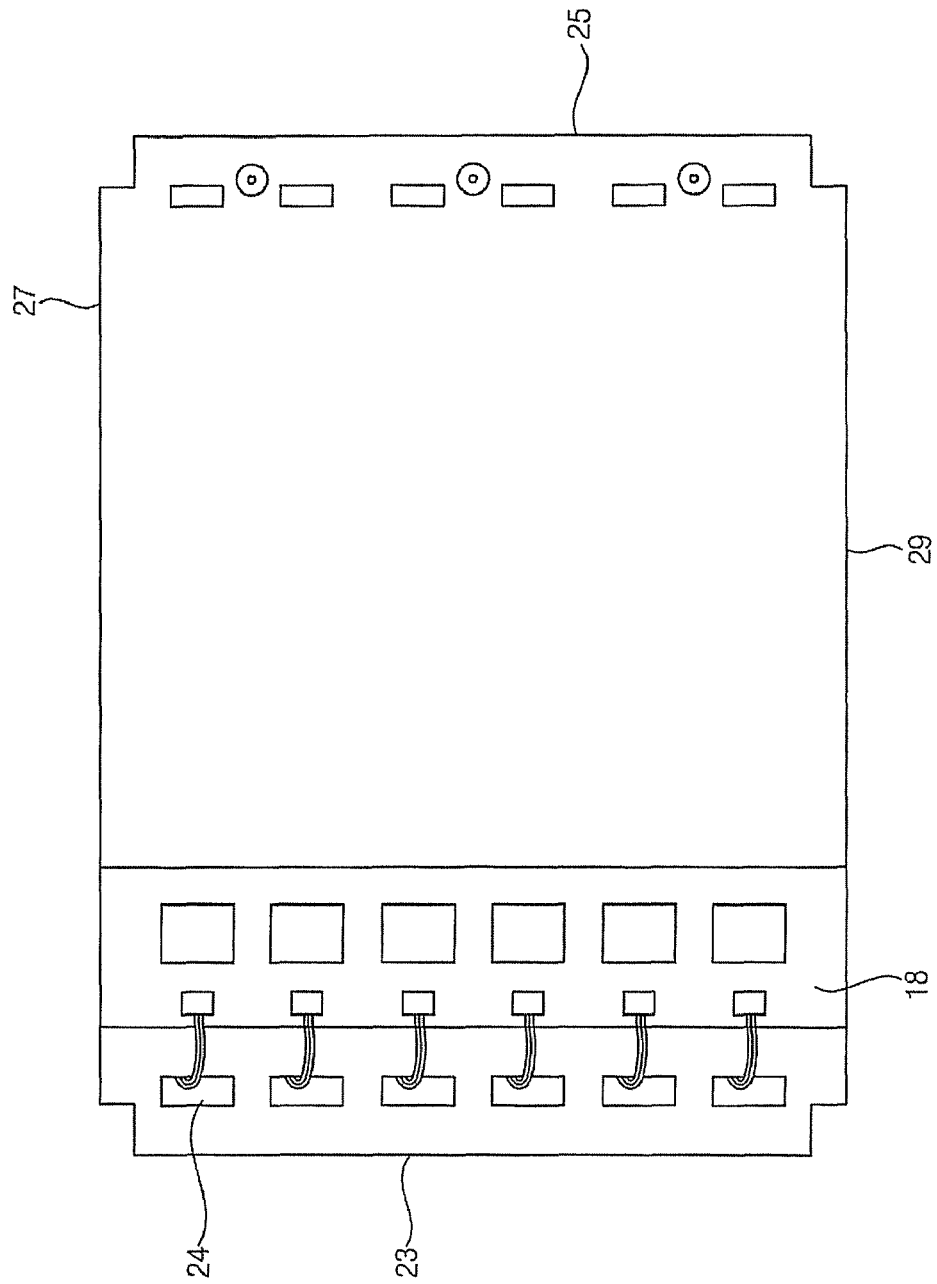
FIG. 3 is a back side view illustrating the backlight assembly in FIG. 2.

FIG. 3 is a backside view of the backlight assembly in FIG. 2.

Referring to FIGS. 1 to 3, the backlight assembly 5 further includes a first lamp holder 41, a second lamp holder 43 and a power supply unit 18.

The first lamp holder 41 holds a first end portion of the lamp body 11, where the first electrode part 13 is disposed, and the second lamp holder 43 holds a second end portion of the lamp body 11, where the second electrode part 15 is disposed. In one exemplary embodiment, the first lamp holder 41 holds two lamps 10, and the second lamp holder 43 also holds two lamps 10. The first lamp holder 41 is fastened to the bottom plate 21 such that the first lamp holder 41 is adjacent to the first sidewall 23, and a connector is drawn to a back side face of the bottom plate 21 through the opening 24 portions.

The connector is electrically connected to the power supply unit 18, and the power supply unit 18 applies the lamp driving voltage to the first electrode part 13. The power supply unit 18 is disposed on the back side face of the bottom plate 21 such that the power supply unit 18 is adjacent to the first sidewall 23.

Figure 4:
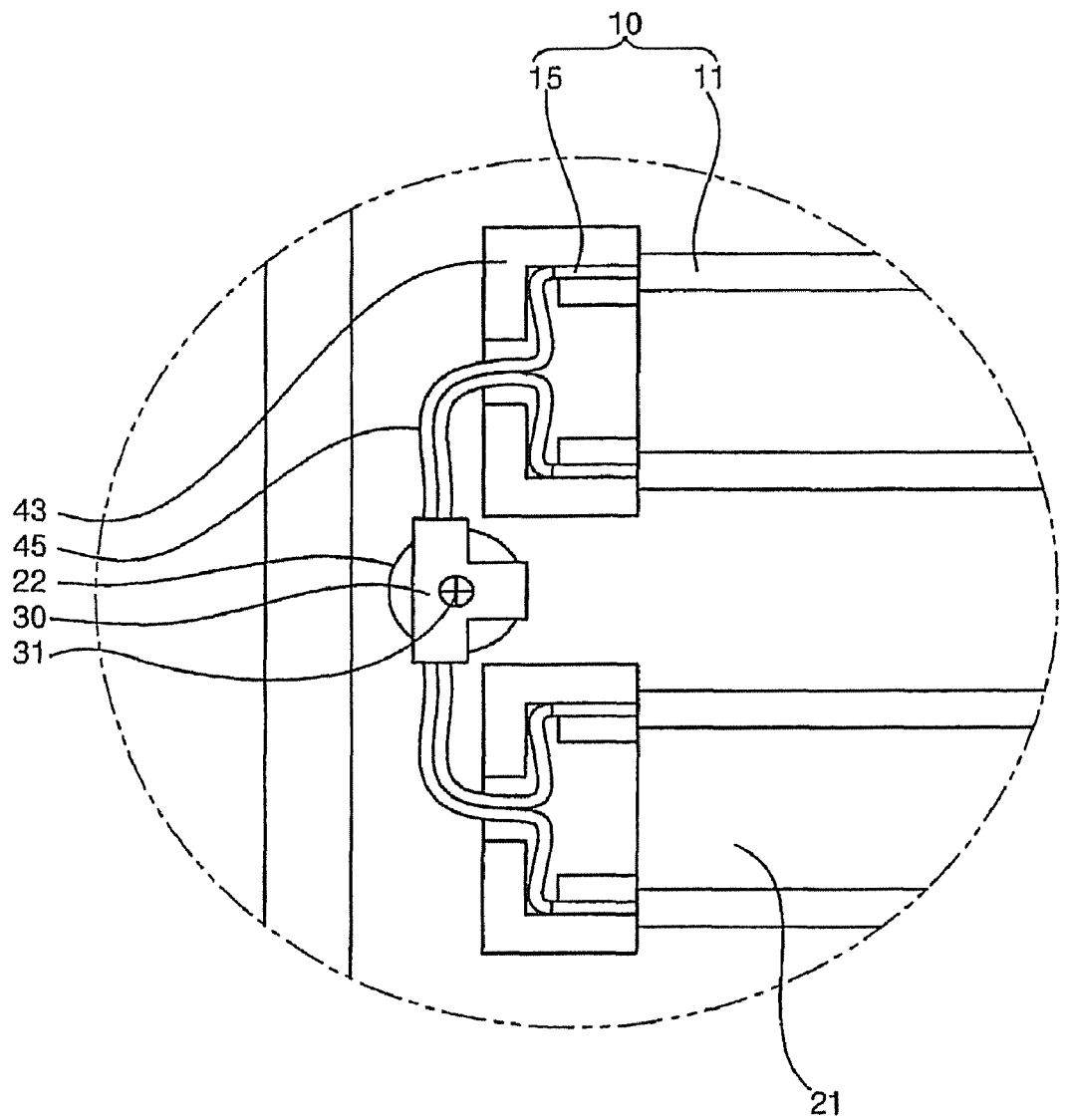
FIG. 4 is an enlarged view of portion 'A' in FIG. 2.
Figure 5:
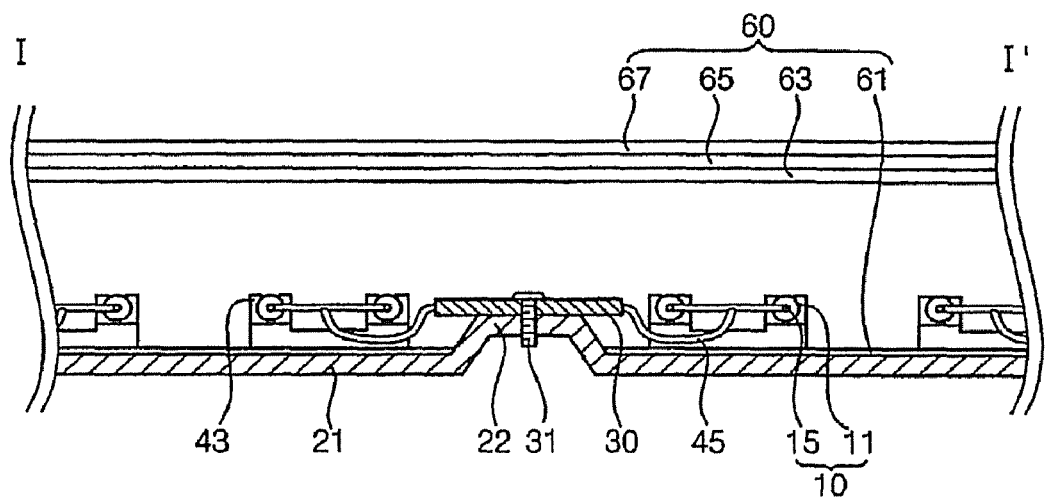
FIG. 5 is a cross-sectional view taken along line I-I' in FIG. 2.

FIG. 4 is an enlarged view of a portion 'A' in FIG. 2. FIG. 5 is a cross-sectional view taken along a line I-I' in FIG. 2.

Referring to FIG. 4, the second lamp holder 43 includes two holding parts having a slit-shape. Two of the second end portions of the two lamps 10 are inserted into the holding parts. The second lamp holder 43 exposes the lead wire of the second electrode part 15.

The grounding portions 22 protrude from the bottom plate 21 such that the grounding portions 22 are disposed between the second electrode parts 15. In one exemplary embodiment, the grounding portions 22 have a slightly smaller height relative to that of the second electrode parts 15 with respect to the bottom plate 21. As shown in FIG. 5, four of the second electrode parts 15 (two associated with each one of the second lamp holders 43) are adjacent to one of the grounding portions 22.

In exemplary embodiments, the conductive member 30 includes metal having high conductivity. In one exemplary embodiment, the conductive member 30 includes copper (Cu). The conductive member 30 is fastened to the grounding portion 22 by a fastening member 31, such as a screw. In another exemplary embodiment, when the conductive member 30 is fastened to the grounding portion 22, the conductive member 30 has substantially the same height as that of the second electrode part 15 with respect to the bottom plate 21. In another exemplary embodiment, the conductive member 30 has a slightly larger area than that of the grounding portion 22. The conductive member 30 includes protrusions for being combined with wires. The protrusions will be explained in detail in the following.

Referring to FIGS. 1, 2 and 4, the backlight assembly 5 may further include a wire 45. The wire 45 electrically connects the second electrode part 15 to the conductive member 30. In detail, two of the second electrode parts 15, which are disposed at a right portion with respect to the grounding portion 22, are electrically connected to the conductive member 30 through a first branch of the wire 45, and two of the second electrode parts 15, which are disposed at a left portion with respect to the grounding portion 22, are electrically connected to the conductive member 30 through a second branch of the wire 45. Lengths of the branches of the wires 45 from the second electrode parts 15 to the conductive member 30 may be substantially the same.

In one exemplary embodiment, the wire 45 is electrically connected to the protrusions of the conductive member 30 through soldering. In an alternative exemplary embodiment, end portions of the wire 45 may have connecting terminals for being connected to the second electrode part 15 and the conductive member 30.

As a result, the second electrode part 15 is electrically connected to the bottom plate 21 of the receiving container (or grounded) through the wire 45 and the conductive member 30. The second electrode part 15 has a ground potential of 0 volt (V). When the lamp-driving voltage provided by the power supply unit 18 is applied to the first electrode part 13, the lamp 10 generates light.

In order to generate uniform light throughout the lamps 10, substantially the same driving voltages may be applied to the lamps 10, when a plurality of lamps 10 is driven in parallel. In order to apply substantially the same lamp-driving voltages to the lamps 10, the power supply unit 18 may include a circuit that controls the lamp-driving voltages to be substantially the same.

Figure 6:
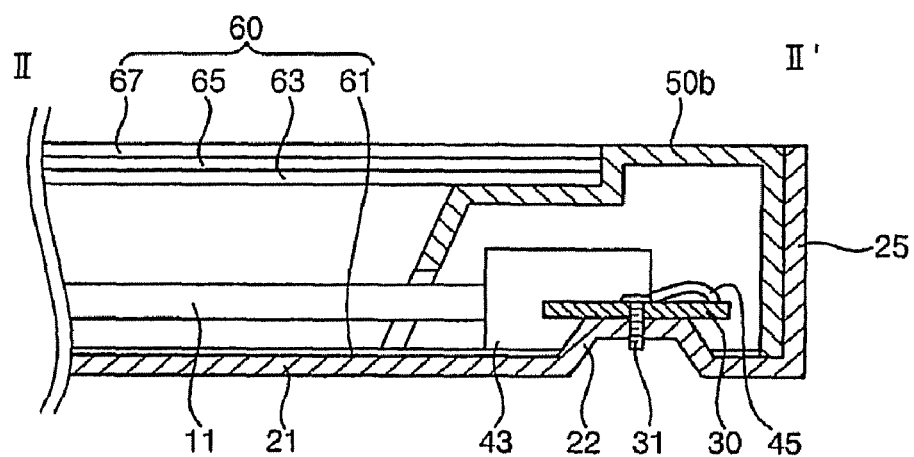
FIG. 6 is a cross-sectional view taken along line II-II' in FIG. 2.

FIG. 6 is a cross-sectional view taken along line II-II' in FIG. 2.

Referring to FIG. 6, the backlight assembly 5 may further include first and second side molds 50a and 50b, respectively, and optical sheets 60.

The first and second side molds 50a and 50b are disposed along the first and second sidewalls 23 and 25, respectively. The first and second side molds 50a and 50b cover the first and second lamp holders 41 and 43, respectively. The first and second side molds 50a and 50b each include two supporting portions that make contact with the bottom plate 21, and an upper portion that connects the two supporting portions. In the case of the first side mold 50a disposed along the first sidewall 23, the two supporting portions face each other with the first lamp holder 41 disposed therebetween. In the case of the second side mold 50b disposed along the second sidewall 25, the two supporting portions face each other with the second lamp holder 43 and the grounding portions 22 disposed therebetween. The upper portions of the first and second side molds 50a and 50b each have a stepped portion.

The optical sheets 60 enhance optical characteristics of light generated by the lamps 10. The optical sheets 60 may include a reflective sheet 61, a diffusion sheet 63 and light-condensing sheets 65 and 67. The reflective sheet 61 is disposed on the bottom plate 21 and under the lamps 10. The reflective sheet 61 reflects light generated by the lamps 10. In one exemplary embodiment, the reflective sheet 61 may include polyethylene terephthalate (PET) or polycarbonate (PC).

The diffusion sheet 63 diffuses light generated by the lamps 10 to enhance luminance uniformity. The light-condensing sheets 65 and 67 are disposed over the diffusion sheet 63 to condense light, in order to adjust light paths so that the light paths approach a normal line of the optical sheets 60. The diffusion sheet 63 and the light-condensing sheets 65 and 67 are disposed on and supported by the stepped portion of the first and second side molds 50a and 50b.

Figure 7:
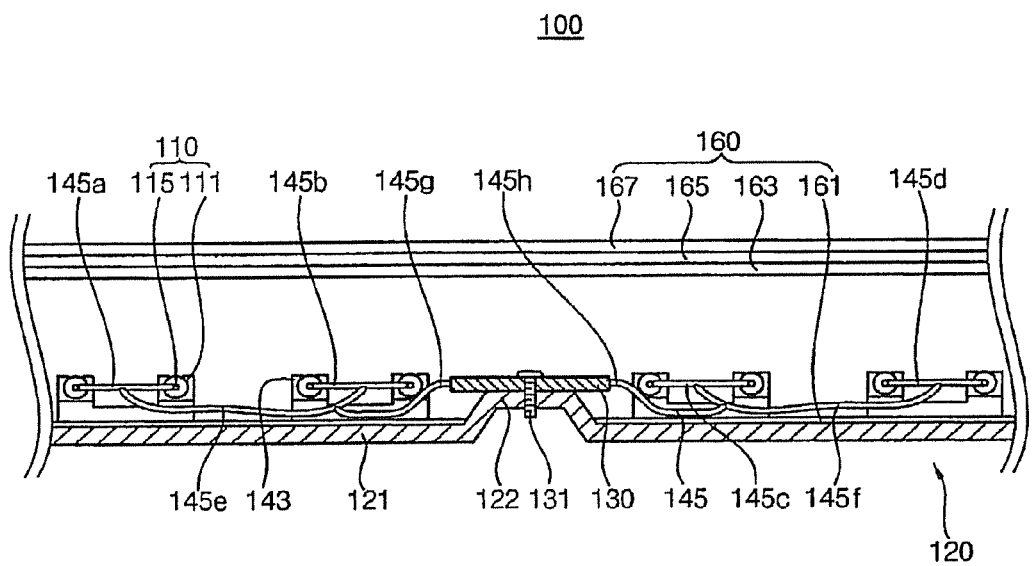
FIG. 7 is a cross-sectional view illustrating another exemplary embodiment of a main portion of a backlight assembly according to the present invention.

FIG. 7 is a cross-sectional view illustrating another exemplary embodiment of a portion of a backlight assembly according to the present invention.

Referring to FIG. 7, a backlight assembly 100 includes a plurality of lamps 110, a receiving container 120, a first lamp holder (not shown), a second lamp holder 143, a conductive member 130, a wire 145 and optical sheets 160.

The backlight assembly 100 is substantially the same as the backlight assembly 5 in FIGS. 1 to 6 except for a number of lamps grounded to one grounding portion.

A bottom plate 121 of the receiving container 120 includes a plurality of grounding portions 122, and a plurality of second electrode parts 115 adjacent to one of the grounding portions 122. In one exemplary embodiment, there may be eight second electrode parts 115 corresponding to (or associated with) one grounding portion 122. In detail, a plurality, such as four, of the second electrode parts 115 are disposed at a left portion of one of the grounding portions 122, and four of the second electrode parts 115 are disposed at a right portion of the same grounding portion 122. In alternative exemplary embodiments, a number of lamps 110 disposed symmetrically with respect to one of the grounding portions 122 may be adjusted as is suitable for the purpose described herein. In one exemplary embodiment, six of the lamps 110 may be disposed at a right portion of one of the grounding portions 122, and six of the lamps 110 may be disposed at a left portion of the same grounding portion 122.

A wire 145 has a first branch 145a, a second branch 145b, a third branch 145c, a fourth branch 145d, a fifth branch 145e, a sixth branch 145f, a seventh branch 145g and an eighth branch 145h. Each of the first to fourth branches 145a, 145b, 145c and 145d electrically connects two adjacent lamps 110. The first and second branches 145a and 145b of the wire 145, which is disposed at a left portion is of the grounding portion 122, are electrically connected to each other by the fifth branch 145e, and the third and fourth branches 145c and 145d disposed at a right portion of the grounding portion 122 are electrically connected to each other by the sixth branch 145f. The seventh branch 145g electrically connects a portion, such as a center portion, of the fifth branch 145e to the grounding portion 122, and the eighth branch 145h electrically connects a portion, such as a center portion, of the sixth branch 145f to the same grounding portion 122. As a result, a length of each branch of the wire 145 is considered to be from the grounding portion 122 to a corresponding lamp of the eight lamps 110. In one exemplary embodiment, each of the branches 145a to 145h may be electrically connected through soldering.

The optical sheets 160 enhance optical characteristics of light generated by the lamps 110. The optical sheets 160 may include a reflective sheet 161, a diffusion sheet 163 and light-condensing sheets 165 and 167. The reflective sheet 161 is disposed on the bottom plate 121 and under the lamps 110. The reflective sheet 161 reflects light generated by the lamps 110. In one exemplary embodiment, the reflective sheet 161 may include polyethylene terephthalate (PET) or polycarbonate (PC).

The diffusion sheet 163 diffuses light generated by the lamps 110 to enhance luminance uniformity. The light-condensing sheets 165 and 167 are disposed over the diffusion sheet 163 to condense light, in order to adjust light paths so that the light paths approach a normal line of the optical sheets 160.

Figure 8:
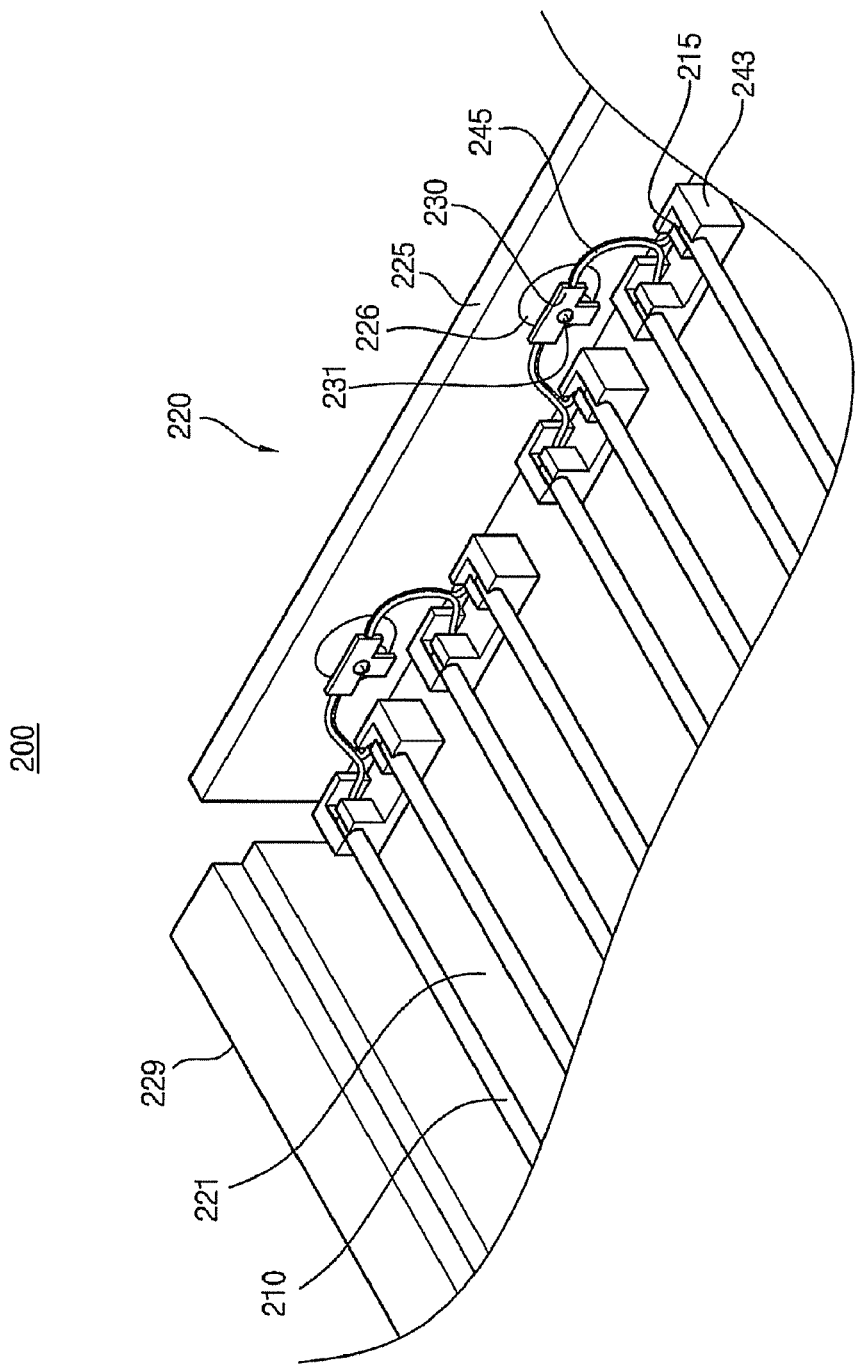
FIG. 8 is a perspective view illustrating another exemplary embodiment of a backlight assembly according to the present invention.

FIG. 8 is a perspective view of another exemplary embodiment of a backlight assembly according to the present invention.

Referring to FIG. 8, a backlight assembly 200 includes a plurality of lamps 210, is a receiving container 220, a first lamp holder (not shown), a second lamp holder 243, a conductive member 230, a wire 245 and optical sheets (not shown). The receiving container 220 includes first and third sidewalls (not shown), second sidewall 225, fourth sidewall 229 and a bottom plate 221, the sidewalls and the bottom plate defining a receiving space on an inside of the receiving container 220.

The backlight assembly 200 is substantially the same as the backlight assembly 5 FIGS. 1 to 6 except for a position of a grounding portion 226.

The grounding portion 226 is disposed at a second sidewall 225 of the receiving container 220, unlike the receiving container 20 in FIGS. 1 to 6. In detail, the grounding portion 226 is formed on the second sidewall 225 such that the grounding portion 226 is disposed between the second electrode parts 215. The grounding portion 226 protrudes from the second sidewall 225 toward the inside of the receiving container 220. For example, four of the second electrode parts 215 are considered as being adjacent to the one grounding portion 226 as illustrated I FIG. 8.

The conductive member 230 is fastened to the grounding portion 226 through a screw 231, and the wire 245 electrically connects the second electrode part 215 to the conductive member 230. In one exemplary embodiment, the wire 245 is, soldered to the second electrode part 215 and the conductive member 230.

Figure 9:
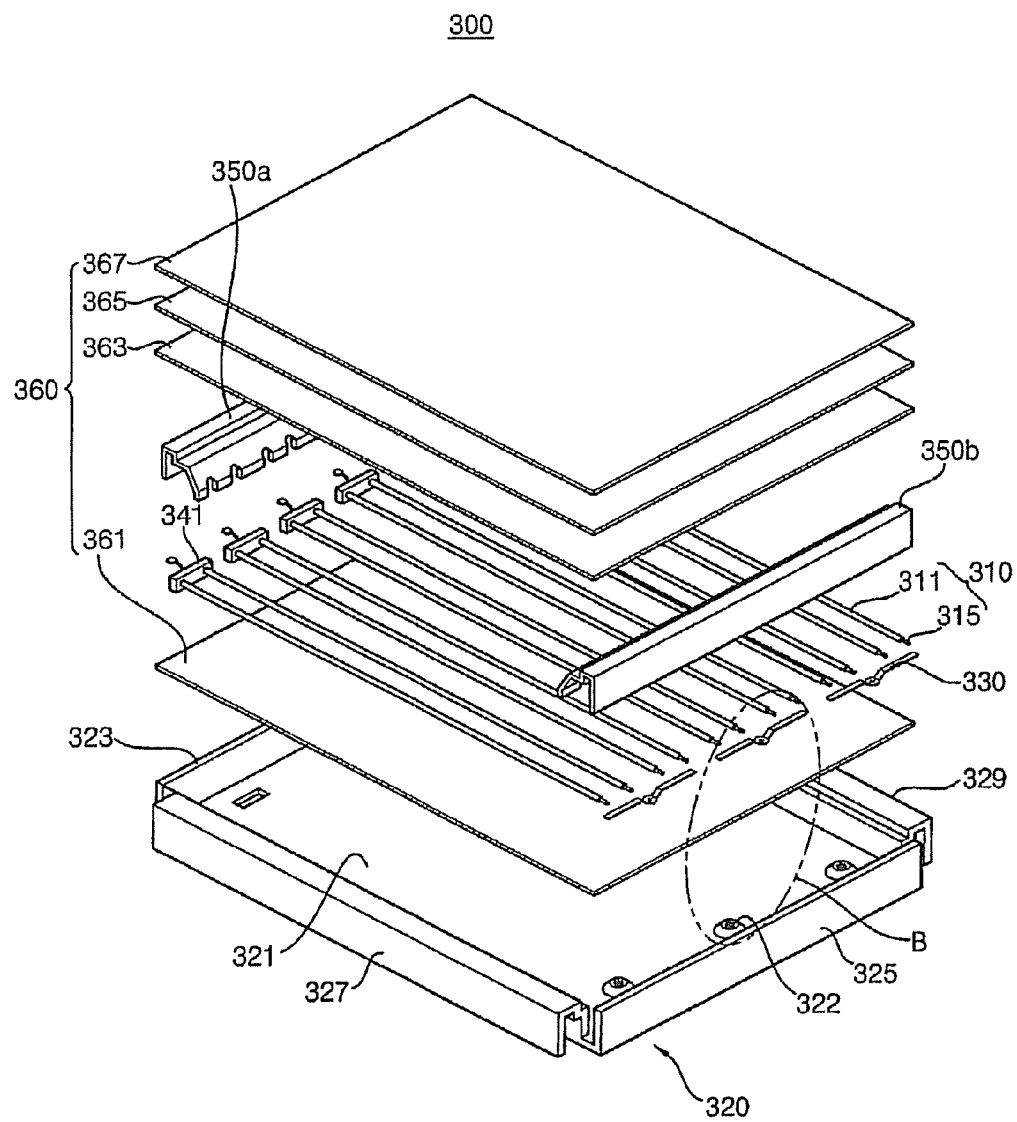
FIG. 9 is an exploded perspective view illustrating another exemplary embodiment of a backlight assembly according to the present invention.
Figure 10:
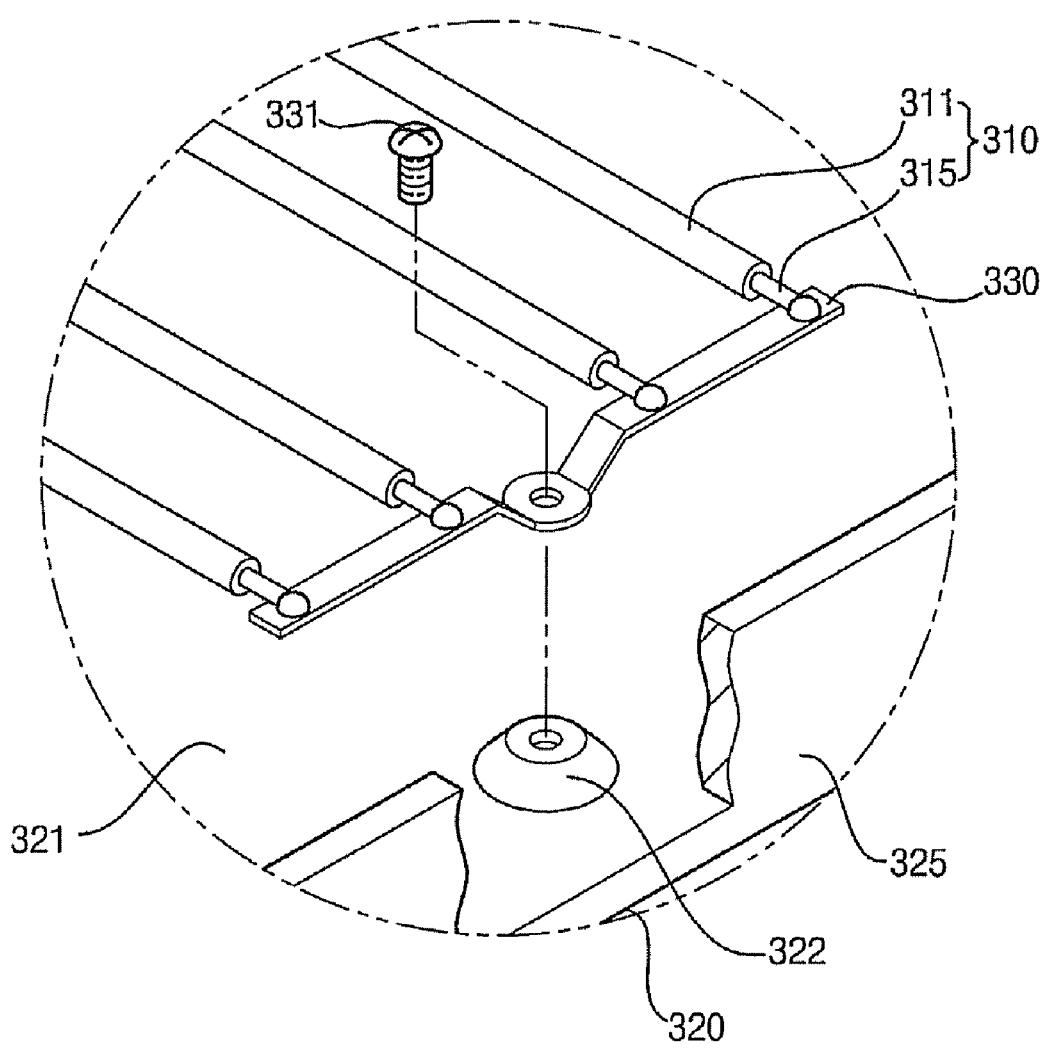
FIG. 10 is an enlarged view of portion 'B' in FIG. 9.

FIG. 9 is an exploded perspective view illustrating another exemplary embodiment of a backlight assembly according to the present invention. FIG. 10 is an enlarged view illustrating portion 'B' in FIG. 9.

Referring to FIG. 9, a backlight assembly 300 includes a plurality of lamps 310, a receiving container 320, a lamp holder 341, a plurality of conductive members 330 and optical sheets 360.

The lamps 310, the receiving container 320 and the optical sheets 360 are substantially the same as the lamps 10, the receiving container 20, and the optical sheets 60 in FIG. 1, respectively. The receiving container 320 includes a bottom plate 321, a first sidewall 323, a second sidewall 325, a third sidewall 327 and a fourth sidewall 329.

As illustrated in FIGS. 9 and 10, the lamp holder 341 is combined with only the first end portion of a lamp body 311. The lamp holder 341, first and second side molds 350a and 350b, reflective sheet 361, diffusion sheet 363 and light-condensing sheets 365 and 367 are substantially the same as the lamp holder 41, first and second side molds 50a and 50b, reflective sheet 61, diffusion sheet 63 and light-condensing sheets 65 and 67 in FIGS. 1 to 6.

Referring to FIG. 10, the plurality of conductive members 330 is fastened to grounding portions 322 formed on a bottom plate 321 of the receiving container 320, respectively. A portion, such as a center portion, of each of the conductive members 330 is recessed toward the bottom plate 321, and the conductive members 330 are extended lengthwise along the second sidewall 325. The conductive member 330 is fastened to the grounding portion 322 through a securing member 331, such as a screw.

Second electrode parts 315 are disposed such that a number of second electrode parts are disposed symmetrically on each of the left and right sides of the grounding portion 322. In one exemplary embodiment, a total of four second electrode parts 315 are disposed such that two of the second electrode parts 315 are disposed at a left side, and the remaining two of the second electrode parts 315 are disposed at a right side, respectively, of the grounding portion 322. In another exemplary embodiment, lead wires (not shown) of the second electrode parts 315 are soldered to the conductive members 330.

Figure 11:
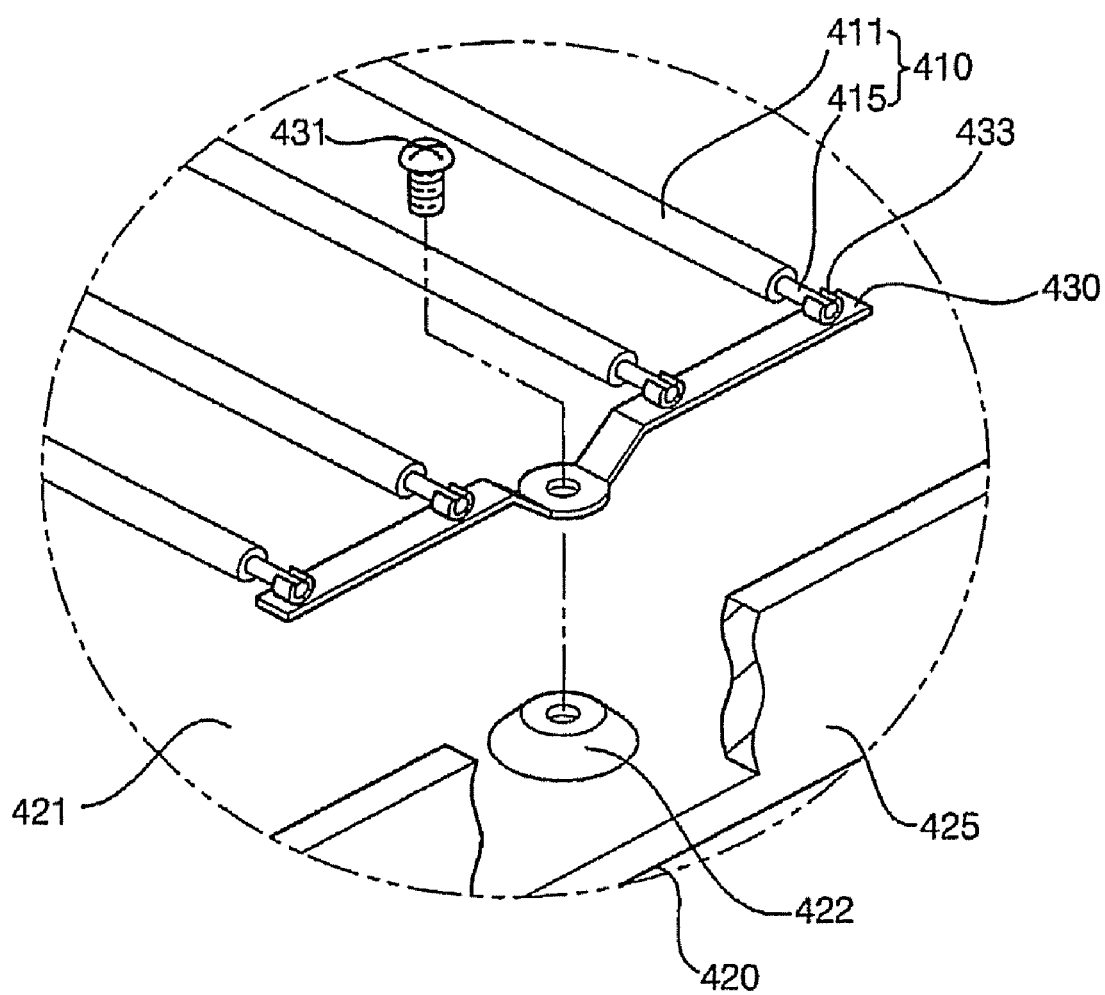
FIG. 11 is a perspective view illustrating a main portion of another exemplary embodiment of a backlight assembly according to the present invention.

FIG. 11 is a perspective view illustrating another exemplary embodiment of a portion of a backlight assembly according to the present invention.

Referring to FIG. 11, a backlight assembly 400 a plurality of lamps 410, a receiving container 420, a lamp holder (not shown), a conductive member 430 and optical sheets (not shown). The backlight assembly 400 is substantially the same as the backlight assembly 300 in FIGS. 9 and 10 except for the conductive member 430. The lamp body 411 is substantially the same as the lamp body 11 in FIGS. 1 to 6.

The conductive member 430 is essentially the same as the conductive members 330 in FIG. 10 except for clips 433. The conductive member 430 includes the clips 433 which may be disposed on an upper or a lower surface of the conductive member 430. In detail, a number of clips 433 are formed on the conductive member 430 such that a symmetrical number of clips 433 are formed on the left and right sides, respectively, of a grounding member 422. In one exemplary embodiment, four clips 433 are formed on the conductive member 430 such that two clips 433 are disposed at a left side and the remaining two clips 433 are disposed at a right side of the grounding member 422 and the four clips 433 are symmetrically disposed. A second electrode part 415 is inserted into the clip 433.

A plurality of conductive members 430 is fastened to the grounding members 422 formed on a bottom plate 421 of the receiving container 420, respectively. A portion, such as a center portion, of each of the conductive members 430 is recessed toward the bottom plate 421 and the conductive members 430 are extended lengthwise along a second sidewall 425. The recessed portion of the conductive member 430 allows extensions of the lengthwise portion, and consequently the lamps 410, to be spaced apart from the bottom plate 421 by a predetermined distance relative to the bottom plate 421. The conductive member 430 is fastened to the grounding member 422 through a securing member 431, such as a screw.

Figure 12:
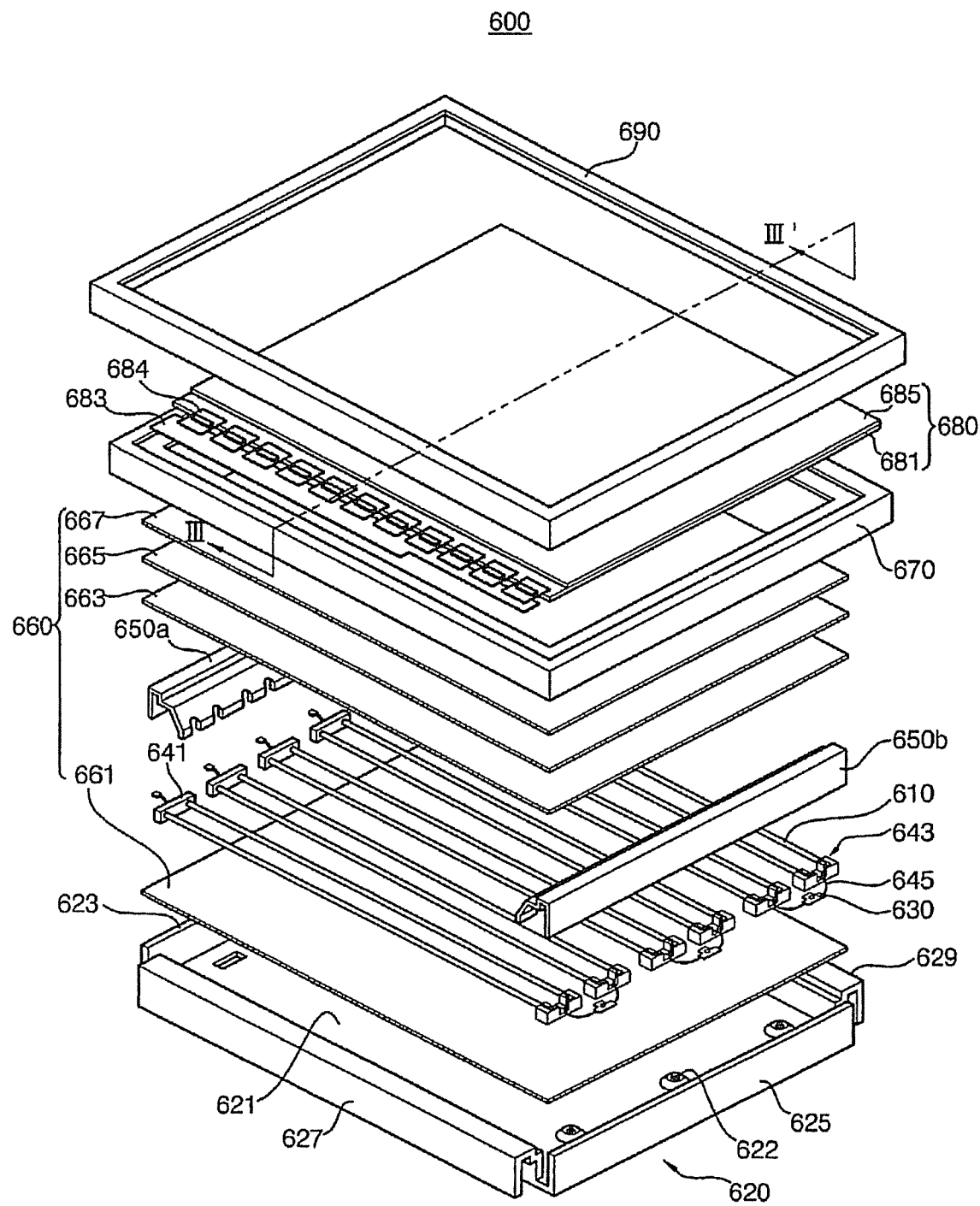
FIG. 12 is an exploded perspective view illustrating an exemplary embodiment of a display device according to the present invention.

FIG. 12 is an exploded perspective view of an exemplary embodiment of a display device according to the present invention.

Referring to FIG. 12, a display device 600 includes a receiving container 620, a plurality of conductive members 630, a power supply unit 618 (see FIG. 13), a plurality of lamps 610 and a display panel 680. The receiving container 620 includes first sidewall 623, second sidewall 625, third sidewall 627, fourth sidewall 629 and a bottom plate 621 defining a receiving space on an inside of the receiving container 620.

The receiving container 620, the conductive members 630, the power supply unit 618, the lamps 610 and lamp body 611 are substantially the same as the receiving container 20, the conductive members 30, the power supply unit 18, the lamps 10 and the lamp body 11 in FIGS. 1 to 6, respectively.

The lamps 610 are disposed at a bottom plate 621 of the receiving container 620, on which a reflective sheet 661 is disposed. A first end portion of the lamp 610 is combined with a first lamp holder 641, and the first lamp holder 641 is electrically connected to the power supply unit 618 disposed at a back side face of the bottom plate 621.

A second end portion of each of the lamps 610 is combined with a second lamp holder 643, and the second electrode part 615, which is disposed adjacent to the second end portion of each of the lamps 610, is combined with one of the conductive members 630 through a wire 645. Each of the conductive members 630 is fastened to a grounding portion 622 through a fastening member 631, such as a screw (see FIG. 13).

The display device 600 further includes first and second side molds 650a and 650b, optical sheets 660 and a middle mold 670.

The first side mold 650a covers the first lamp holder 641 and the second side mold 650b covers the second lamp holder 643. A diffusion sheet 663 and light-condensing sheets 665 and 667 of the optical sheets 660 are disposed on stepped portions of the first and second side molds 650a and 650b, and stepped portions of the third sidewall 627 and the fourth sidewall 629 of the receiving container 620.

The middle mold 670 compresses edge portions of the light-condensing sheets 665 and 667, and is combined with the receiving container 620. The middle mold 670 has a panel guide recess.

Figure 13:
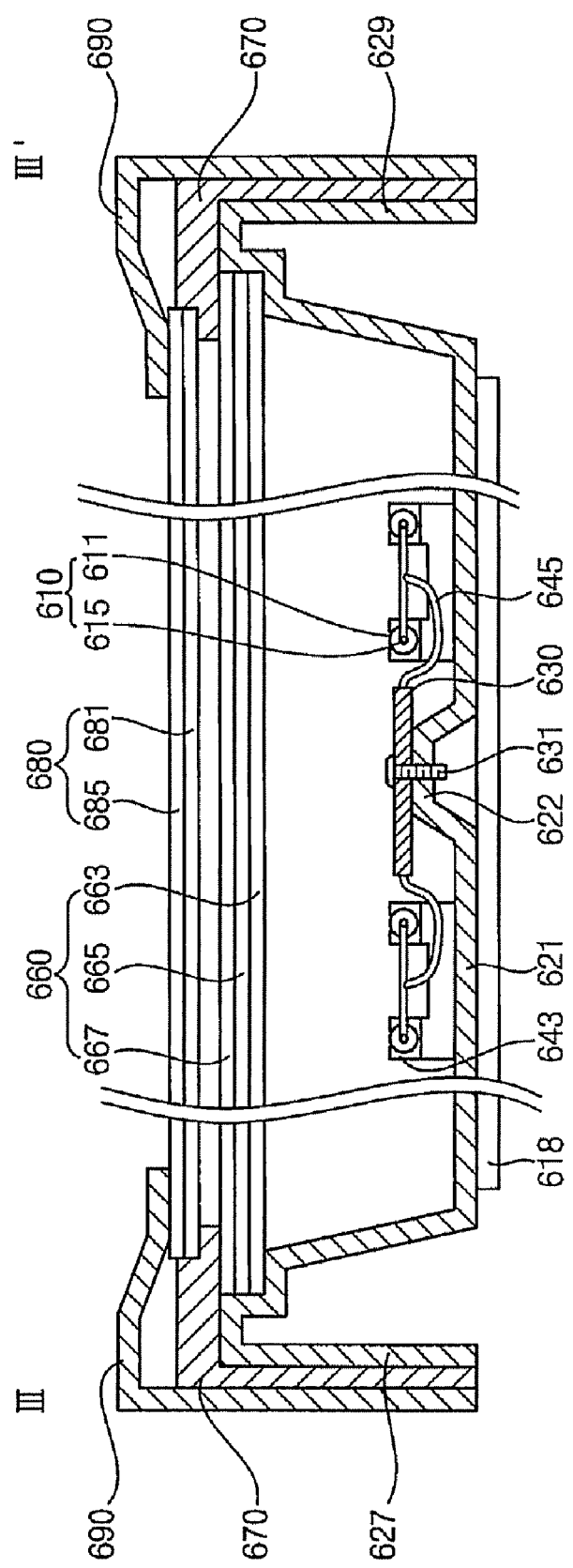
FIG. 13 is a cross-sectional view taken along line III-III' in FIG. 12.

FIG. 13 is a cross-sectional view taken along line III-III' in FIG. 12.

Referring to FIGS. 12 and 13, the display panel 680 is disposed on the panel guide recess of the middle mold 570. The display panel 680 receives light that exits from the optical sheets 660 to convert the light into images. The display panel 680 includes a thin-film transistor (TFT) substrate 681, a color filter substrate 685 and a liquid crystal layer (not shown). The TFT substrate 681 and the color filter substrate 685 face each other. The liquid crystal layer is disposed between the TFT substrate 681 and the color filter substrate 685.

The TFT substrate 681 includes a plurality of gate lines (not shown) extended along a first direction, and a plurality of data lines (not shown) extended along a second direction that is substantially perpendicular to the first direction. The data lines and the gate lines define pixel regions arranged substantially in a matrix shape. A pixel electrode and a TFT are formed in each of the pixel regions. When a gate voltage is applied to the TFT through one of the gate lines, the TFT is turned on. When the TFT is turned on, a data voltage of the data line is applied to the pixel electrode through the TFT.

The color filter substrate 685 may include color filters. In exemplary embodiments, red-green-blue (RGB) color filters correspond to the pixel regions, respectively, and a common electrode covers the RGB color filters.

The display panel 680 further includes light-polarizing plates (not shown), a printed circuit board (PCB) 683 (see FIG. 12) and a panel printed circuit film 684 (see FIG. 12). The light-polarizing plates are disposed on the color filter substrate 685 and the TFT substrate 681, respectively. In one exemplary embodiment, the polarizing plates are substantially perpendicular to the polarizing axis.

The PCB 683 outputs panel-driving signals such as the gate voltage and the data voltage. A first side of the panel printed circuit film 684 is electrically connected to the display panel 680, and a second side of the panel printed circuit film 684, which is opposite to the first side, is electrically connected to the PCB 683. Liquid crystal molecules of the liquid crystal layer are rearranged in response to the panel-driving signals to change optical transmittance of the liquid crystal layer. As a result, the display panel 680 displays images.

The display device 600 may further include a top chassis 690 exposing an effective display region of the display panel 680, and being combined with the receiving container 620.

Figure 14:
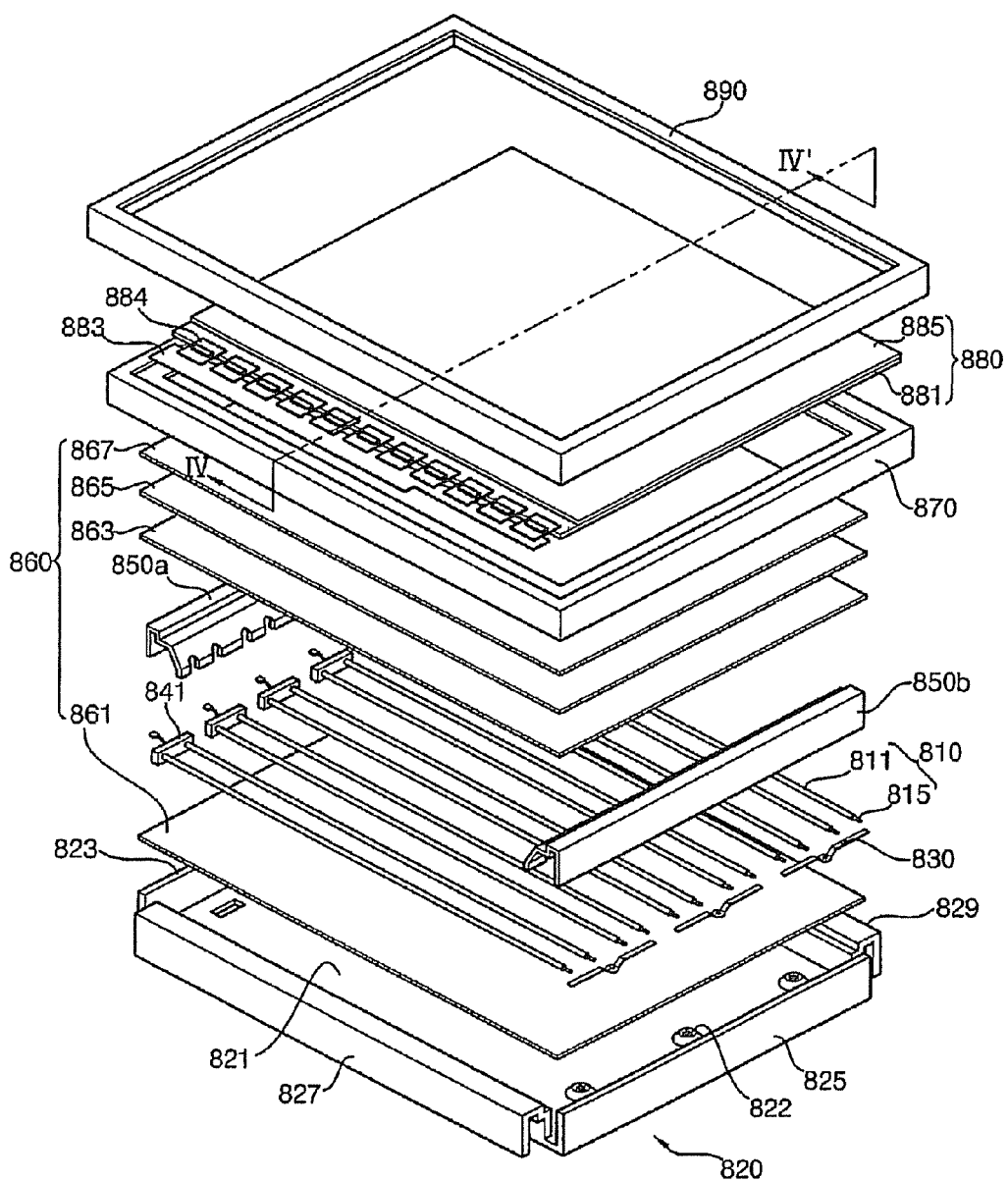
FIG. 14 is an exploded perspective view illustrating another exemplary embodiment of a display device according to the present invention.
Figure 15:
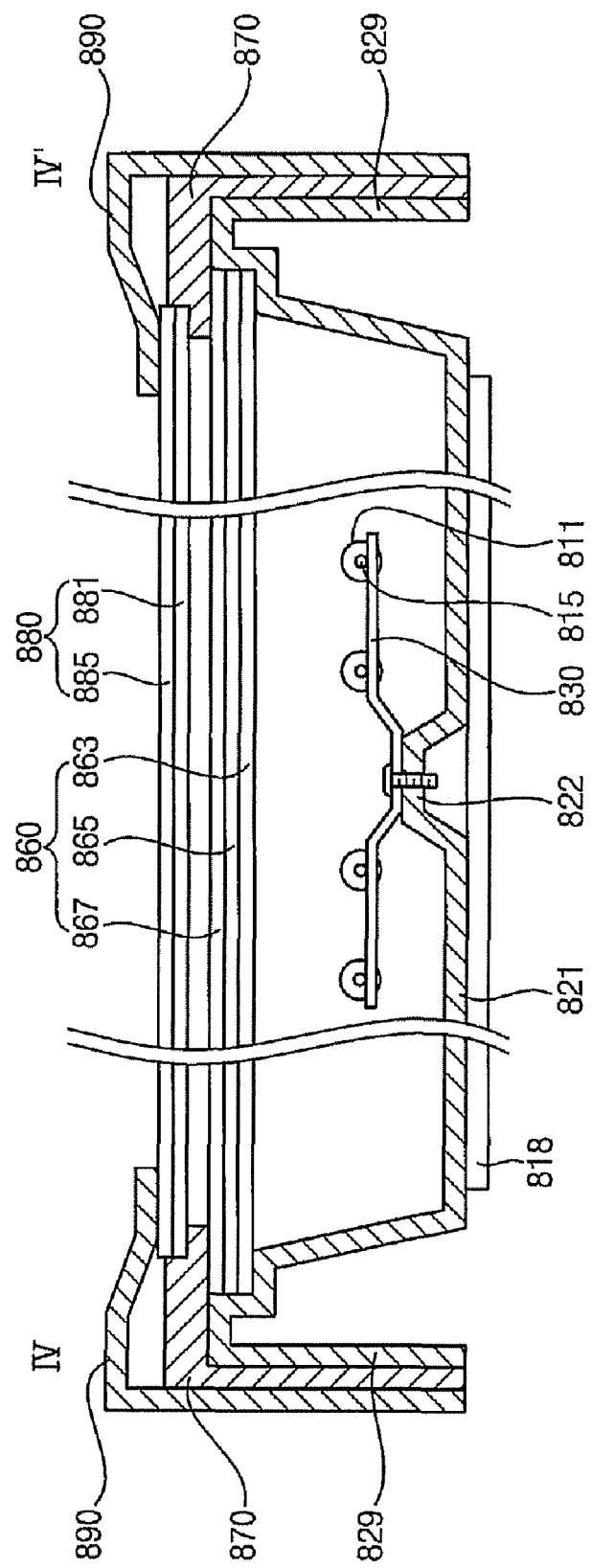
FIG. 15 is a cross-sectional view taken along line IV-IV' in FIG. 14.

FIG. 14 is an exploded perspective view of another exemplary embodiment of a display device according to the present invention, and FIG. 15 is a cross-sectional view taken along line IV-IV' in FIG. 14.

Referring to FIGS. 14 and 15, a display device 800 includes a power supply unit 818, a plurality of lamps 810, a receiving container 820, a plurality of conductive members 830, first and second side molds 850a and 850b, optical sheets 860, a middle mold 870, a display panel 880 and a top chassis 890. The receiving container 820 includes first sidewall 823, second sidewall 825, third sidewall 827, fourth sidewall 829 and a bottom plate 821 defining a receiving space on an inside of the receiving container 820.

The display device 800 is substantially the same as the display device 600 in FIGS. 12 and 13 except that the second lamp holder 643 and the wire 645 are omitted, and the conductive members 830 replace the conductive members 630.

The lamps 810 are disposed at a bottom plate 821 of the receiving container 820, on which a reflective sheet 861 is disposed. A first end portion of the lamp 810 is combined with a first lamp holder 841, and the first lamp holder 841 is electrically connected to the power supply unit 818 disposed at a back side face of the bottom plate 821.

As illustrated in FIGS. 14 and 15, the lamp holder 841 is combined with only the first end portion of a lamp body 811. A diffusion sheet 863 and light-condensing sheets 865 and 867 of the optical sheets 860 are disposed on stepped portions of the first and second side molds 850a and 850b, and stepped portions of the third sidewall 827 and the fourth sidewall 829 of the receiving container 820.

The plurality of conductive members 830 is fastened to grounding portions 822 formed on the bottom plate 821 of the receiving container 820, respectively. A portion, such as a center portion, of each of the conductive members 830 is recessed toward the bottom plate 821, and the conductive members 830 are extended lengthwise along the second sidewall 825. The conductive member 830 is fastened to the grounding portion 822 through a securing member, such as a screw.

The middle mold 870 compresses edge portions of the light-condensing sheets 865 and 867, and is combined with the receiving container 820. The middle mold 870 has a panel guide recess.

FIG. 15 is a cross-sectional view taken along line IV-IV' in FIG. 14.

Referring to FIGS. 14 and 15, the display panel 880 is disposed on the panel guide recess of the middle mold 870. The display panel 880 receives light that exits from the optical sheets 860 to convert the light into images. The display panel 880 includes a thin-film transistor (TFT) substrate 881, a color filter substrate 885 and a liquid crystal layer (not shown).

The display panel 880 further includes light-polarizing plates (not shown), a printed circuit board (PCB) 883 (see FIG. 12) and a panel printed circuit film 884 (see FIG. 12).

Figure 16:
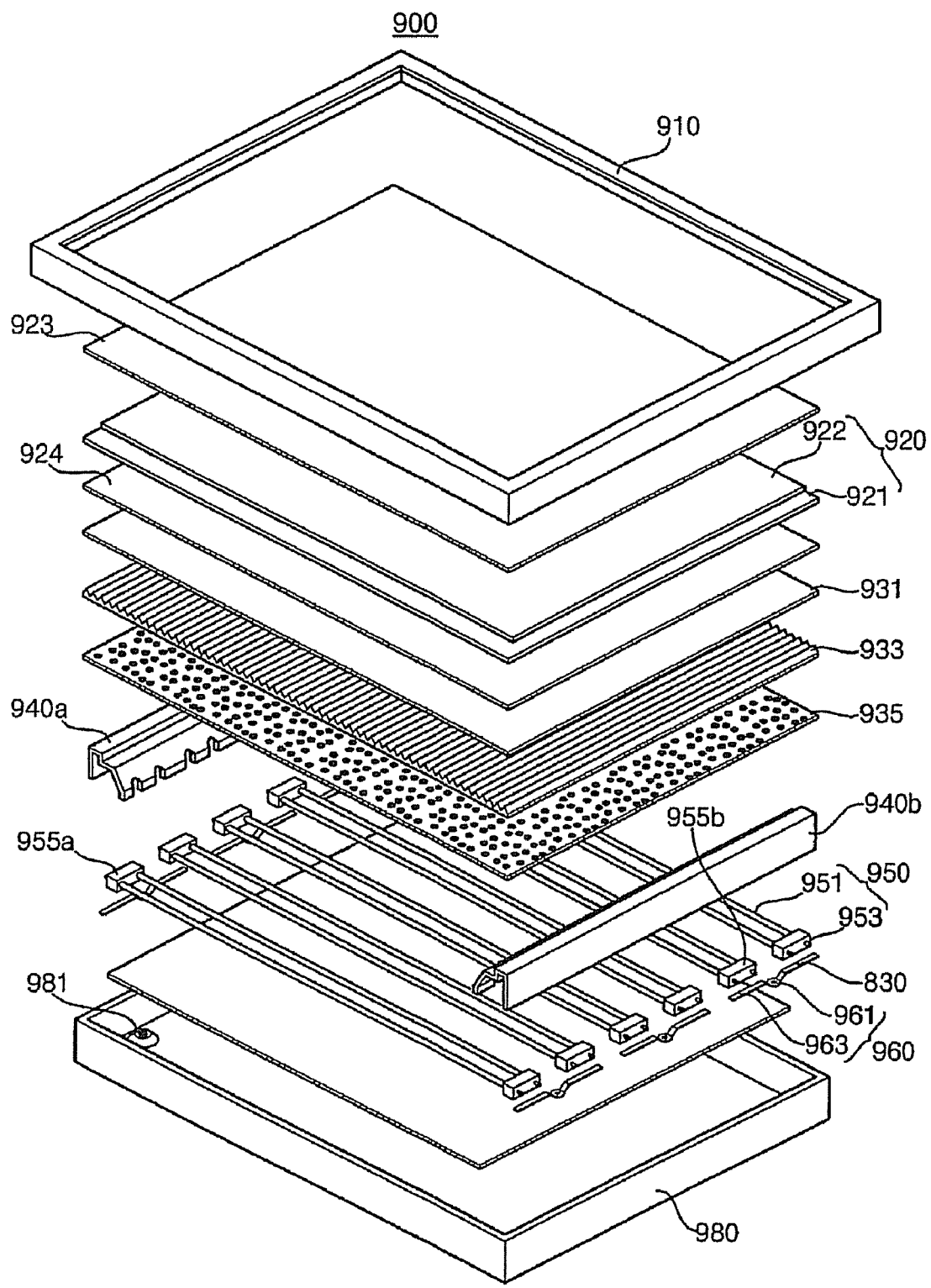
FIG. 16 is an exploded perspective view illustrating another exemplary embodiment of a display device according to the present invention.
Figure 17:
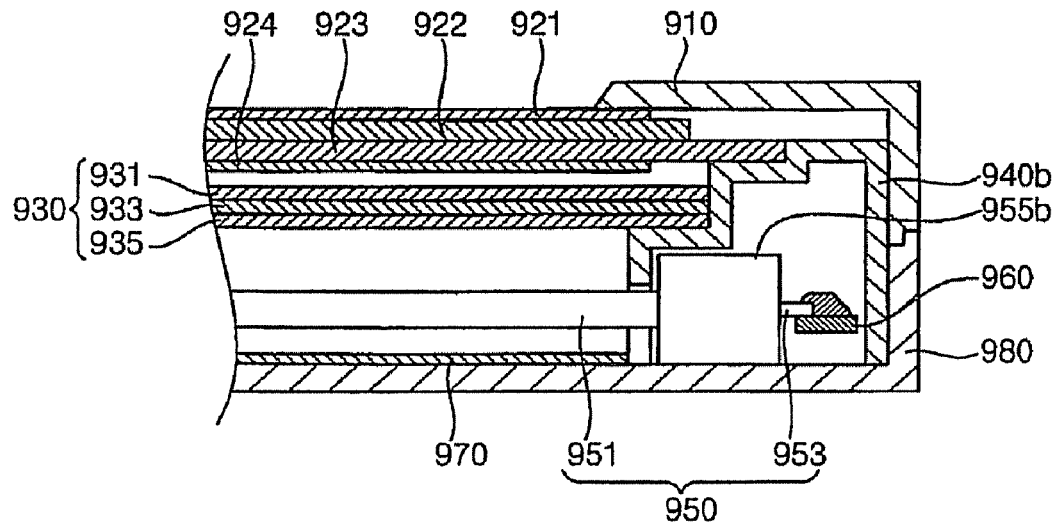
FIG. 17 is a cross-sectional view illustrating the display device in FIG. 16.
Figure 18:
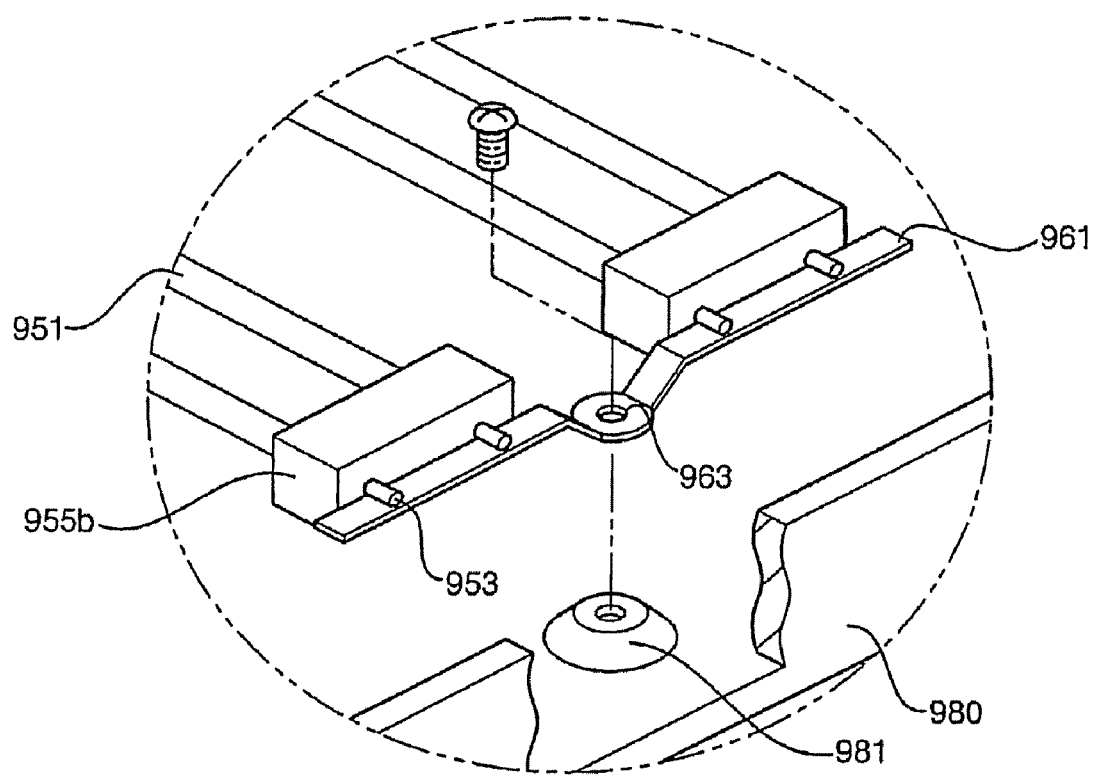
FIG. 18 is an enlarged view illustrating a portion in FIG. 16.

FIG. 16 is an exploded perspective view of an exemplary embodiment of a display device according to the present invention. FIG. 17 is a cross-sectional view of the display device in FIG. 16. FIG. 18 is an enlarged view illustrating a main portion in FIG. 16.

Referring to FIGS. 16, 17 and 18, a display device 900 includes a display panel 920 displaying images, a driver integrated circuit (IC) (not shown) driving the display panel 920, a plurality of lamps 950 providing the display panel 920 with light, a receiving container 980 receiving the lamps 950 and a top chassis 910 combined with the receiving container 980 to cover edge portions of the display panel 920. The display device 900 further includes a plurality of conductive members 960 connecting the lamps 950 in parallel. The conductive members 960 are combined with the receiving container 980 through grounding portions 981 formed in the receiving container 980.

The display panel 920 includes a TFT substrate 921, a color filter substrate 922 facing the TFT substrate 921, and a liquid crystal layer (not shown) disposed between the TFT substrate 921 and the color filter substrate 922. The display panel 920 may further include a first polarizing plate 923 disposed on the color filter substrate 922, and a second polarizing plate 924 disposed on the back side of the TFT substrate 921. The display panel 920 includes a plurality of liquid crystal cells arranged in a matrix shape. The display panel 920 displays images by controlling optical transmittance of each of the liquid crystal cells in response to image signals provided by the driver IC.

The TFT substrate 921 includes a plurality of gate lines (not shown) arranged along a first direction and a plurality of data lines (not shown) arranged along a second direction that is substantially perpendicular to the first direction. The TFT is formed in a region where the data lines and the gate lines cross. A data signal provided from the driver IC is applied to a pixel electrode of the TFT substrate 921 to generate electric fields between the pixel electrode of the TFT substrate 921 and a common electrode of the color filter substrate 922. When the electric fields are generated between the pixel electrode and the common electrode, an arrangement of liquid crystal molecules disposed between the pixel electrode and the common electrode is changed to adjust optical transmittance.

The color filter substrate 922 may include RGB color filters and the common electrode (not shown). The common electrode may include an optically transparent and electrically conductive material such as indium tin oxide (ITO), indium zinc oxide (IZO) and the like. The color filter substrate 922 may have a smaller area than that of the TFT substrate 921.

In one exemplary embodiment, the first and second polarizing plates 923 and 924 are disposed such that a polarizing axis of the first polarizing plate 923 is substantially perpendicular to a polarizing axis of the second polarizing plate 924. The second polarizing plate 924 essentially corresponds to a polarizer and the first polarizing plate 923 essentially corresponds to an analyzer.

The driver IC (not shown) includes terminals for an electric connection. The driver IC is mounted on the TFT substrate 921, and the driver IC is electrically connected to the gate lines and the data lines.

The optical sheets 930 may include a protection sheet 931 disposed under the display panel 920, a prism sheet 933 and a diffusion sheet 935. The diffusion sheet 935 may include a base sheet and a diffusion layer that is formed on the base sheet. In exemplary embodiments, the diffusion sheet 935 may include a plurality of beads. The diffusion sheet 935 diffuses light generated by the lamps 950 to provide the display panel 920 with diffused light. In other exemplary embodiments, the display device may include two or three diffusion sheets overlapped with each other.

The prism sheet 933 may include prism patterns having a substantial prism shape and being arranged substantially in parallel. The prism sheet 933 condenses light to enhance front-view luminance. In exemplary embodiments, the display device may include two prism sheets 933. Prisms of the two sheets 933 may have a specific angle. Light that passes the prism sheet 933 advances along a roughly normal direction of the prism sheet 933 to uniformize luminance. The protection sheet 931 protects the prism sheet 933 that is easily scratched.

Each of the lamps 950 include a lamp body 951 and electrode parts 953 disposed at first and second end portions of the lamp body 951, respectively. Each of the lamps 950 receives electric power from an inverter (not shown) to generate light. A plurality of lamps 950 is arranged substantially in parallel with each other under the display panel 920. In exemplary embodiments, the lamps 950 are arranged in pairs. The first and second end portions of a pair of lamps 950 are inserted into first and second lamp holders 955a and 955b, respectively, such that a portion of each of the first and second end portions passes through one of the first and second lamp holders 955a and 955b. The first and second lamp holders 955a and 955b each support the lamp body 951, and are received in first and second side molds 940a and 940b, respectively.

In one exemplary embodiment, a CCFL may be employed as a type of the lamps 950. In another exemplary embodiment, EEFL may be employed as a type of the lamps 950. The EEFL has high luminance, low price and low power consumption, and a plurality of EEFLs may be driven by one power supply unit.

Each of the conductive members 960 is disposed between pairs of the first lamp holders 955a and/or the second lamp holders 955b. Each of the conductive members 960 includes a combination portion 963 for being combined with one of the grounding portions 981 of the receiving container 980, and a pair of contact portions 961 extended from the combination portion 963 along a direction of arrangement of the lamps 950, or in a direction substantially perpendicular to the longitudinal direction of the lamps 950. Conductive members 960 may be disposed at one end of the lamps 950 or at both ends of the lamps 950.

In exemplary embodiments, the contact portions 961 are higher than the combination portion 963 relative to a bottom surface of the receiving container 980 so that the contact portions 961 may make contact with the electrode parts 953 during an assembly process. The contact portions 961 are extended along opposite directions, respectively, from the combination portion 963. The lamps 950 are paired and the paired lamps 950 are combined with a first and a second lamp holders 955a and 955b at respective ends of the lamps 950. The contact portions 961 of a single conductive member 960 make contact with the electrode parts 953 protruding from one of the first and second lamp holders 955a and 955b, respectively. For each lamp holder, one contact portion 961 is disposed at a left side of the conductive member 960 to contact the electrode parts 953 of a pair of lamps and one contact portion 961 is disposed at a right side of the conductive member 960 to contact the electrode parts 953 of the other pair of lamps. As a result, four lamps 950 are connected to one of the conductive members 960. In one exemplary embodiment, the contact portion 961 and the electrode part 953 may be electrically connected to each other through a conductive solder 990.

In exemplary embodiments, lamps 950 may be divided into more than one group. Each of the conductive members 960 electrically connecting the lamps 950 included in a group in parallel is combined and grounded to the receiving container 980 through a fastening member, such as a screw. Advantageously, an assembly process may be simplified.

A reflective sheet 970 is disposed between the lamps 950 and the receiving container 980 to reflect light generated by the lamps 950 toward the diffusion sheet 935. In one exemplary embodiment, the reflective sheet 970 includes polyethylene terephthalate (PET) or polycarbonate (PC).

The receiving container 980 may include a plurality of grounding portions 981. The receiving container 980 is grounded. The receiving container 980 and the conductive members 960 are combined through the grounding portions 981. Each of the grounding portions 981 is disposed between the first lamp holders 955a and/or the second lamp holders 955b. The grounding portions 981 are combined with the combination portions 963 of the conductive members 960, respectively, through a fastening member to ground the conductive members 960.

The top chassis 910 has an opening that exposes a display region of the display panel 920. The top chassis 910 is combined with the receiving container 980.

Figure 19:
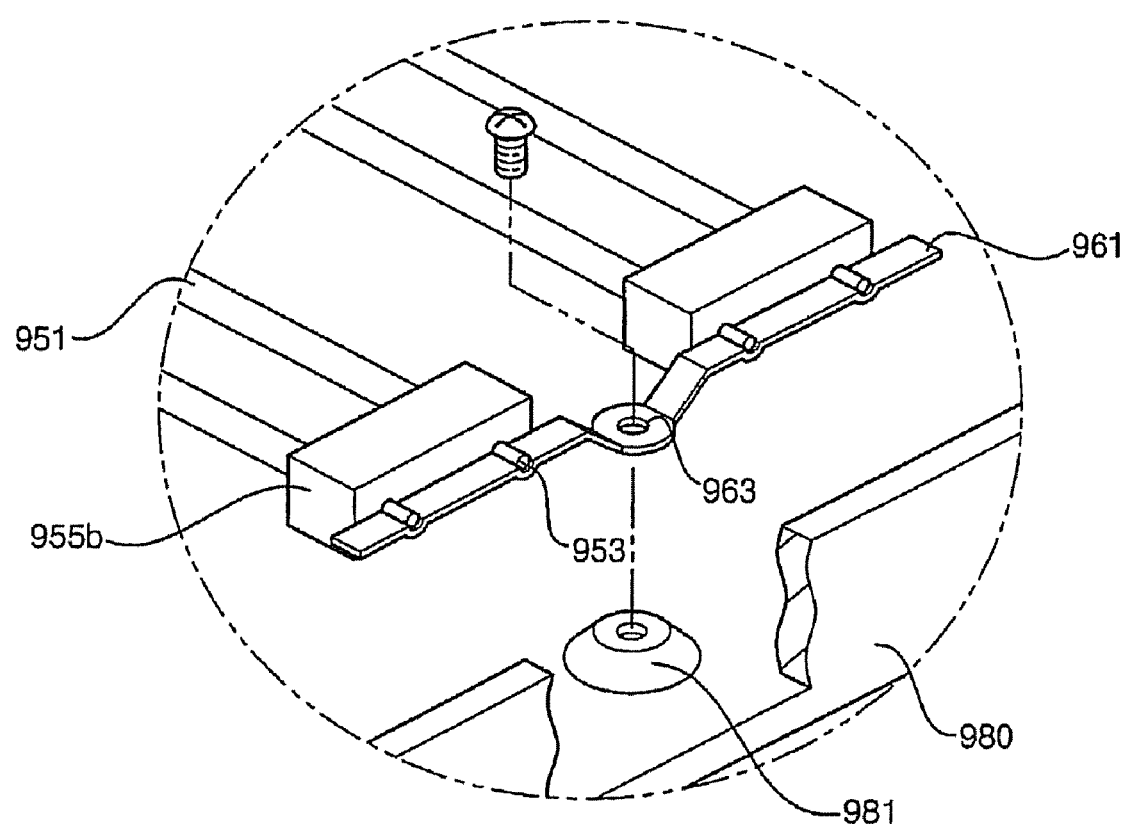
FIG. 19 is a perspective view illustrating another exemplary embodiment of a main portion of a display device according to the present invention.

FIG. 19 is a perspective view illustrating a main portion of another exemplary embodiment of a display device according to the present invention. Referring to FIG. 19, the contact portion 961 of the conductive member 960 includes a contact groove 965 where the electrode part 953 is disposed. The electrode part 953 of the lamp is essentially inserted into the contact groove 965. The contact groove 965 has substantially the same size, such as an outer diameter, as that of the electrode part 953. In one exemplary embodiment, the contact portion 961 is combined with the electrode part 953 through soldering.

The electrode part 953 is fastened to the contact groove 965 and the lamp 950 is grounded to the receiving container 980 via the combination portion 963 and the grounding portion 981.

A second electrode part of a CCFL or an EEFL is grounded to the receiving container 980 through one of the conductive members 960, and a first electrode part of the CCFL or EEFL receives electric power, so that an electric field is generated between the first and second electrodes. As a result, electrons are emitted to generate light.

Exemplary embodiments of the backlight assembly driving lamps in parallel and the display device according to the present invention, do not require a PCB (inverter slave) that grounds the second electrode part. A connector connects the second electrode part to the PCB and a power supply unit (inverter master) provides the PCB with current. Advantageously, a number of elements for assembling the backlight assembly may be reduced to reduce manufacturing costs.

In another exemplary embodiment, the second electrode part is electrically connected directly to the receiving container through one of the conductive members that is electrically connected to the second electrode part by soldering. Advantageously, an assembly process may be simplified.

Having described the example embodiments of the present invention and its advantages, it is noted that various changes, substitutions and alterations can be made herein without departing from the spirit and scope of the invention as defined by appended claims.

What is claimed is:

1. A backlight assembly comprising:
a plurality of lamps, each of the lamps comprising:
  a lamp body,
  a first electrode part disposed at a first end portion of the lamp body, and
  a second electrode part disposed at a second end portion of the lamp body, the second end portion being opposite to the first end portion; a single unitary indivisible receiving container comprising:
  a bottom plate on which the plurality of lamps are disposed,
  a sidewall disposed at an edge portion of the bottom plate to define a receiving space, and
  a grounding portion defined by a portion of the bottom plate or the sidewall; and
a conductive member electrically connected with the second electrode parts of the plurality of lamps and the grounding portion to ground the second electrode parts.

2. The backlight assembly of claim 1, wherein the grounding portion protrudes from the bottom plate.

3. The backlight assembly of claim 2, wherein the conductive member contacts with the grounding portion.

4. The backlight assembly of claim 1, further comprising:
a lamp holder receiving the second end portion of the lamp body with the second electrode part, and fixing the second end portion of the lamp with respect to the bottom plate.

5. The backlight assembly of claim 1, wherein the conductive member is extended along a direction that is substantially perpendicular to a lengthwise direction of the lamp body and at least one of the second electrode parts contacts with the conductive member.

6. The backlight assembly of claim 5, wherein the second electrode part is soldered to the conductive member.

7. The backlight assembly of claim 5, wherein the conductive member comprises a clip and the second electrode part inserted into the clip.

8. The backlight assembly of claim 1, wherein the grounding portion protrudes from the sidewall.

9. The backlight assembly of claim 1, wherein the conductive member contacts with the grounding portion.

10. The backlight assembly of claim 1, wherein the conductive member is screwed together with the grounding portion.

11. A display device comprising:
a plurality of lamps, each of the lamps comprising:
  a lamp body,
  a first electrode part disposed at a first end portion of the lamp body, and
  a second electrode part disposed at a second end portion of the lamp body, the second end portion being opposite to the first end portion;

a single unitary indivisible receiving container comprising:
- a bottom plate on which the plurality of lamps are disposed,
- a sidewall disposed at an edge portion of the bottom plate to define a receiving space, and
- a grounding portion defined by a portion of the bottom plate or the sidewall;

a conductive member electrically connected with the second electrode parts of the plurality of lamps and the grounding portion to ground the second electrode parts; and a power supply unit disposed outside of the receiving container, the power supply unit applying a lamp-driving voltage to the first electrode parts of the plurality of lamps.

12. The display device of claim 11, wherein the grounding portion protrudes from the bottom plate.

13. The display device of claim 12, wherein the conductive member contacts with the grounding portion.

14. The display device of claim 11, further comprising:
a lamp holder receiving the second end portion of the lamp body with the second electrode part, and fixing the second end portion of the lamp with respect to the bottom plate.

15. The display device of claim 11, wherein the conductive member is extended along a direction that is substantially perpendicular to a lengthwise direction of the lamp body and at least one of the second electrode parts contacts with the conductive member.

16. The display device of claim 15, wherein the second electrode part is soldered to the conductive member.

17. The display device of claim 15, wherein the conductive member comprises a clip and the second electrode part inserted into the clip.

18. The display device of claim 11, wherein the grounding portion protrudes from the sidewall.

19. The display device of claim 18, wherein the conductive member contacts with the grounding portion.

20. The display device of claim 11, wherein the conductive member is screwed together with the grounding portion.

* * * * *